(12) United States Patent
Lennen

(10) Patent No.: US 8,599,067 B2
(45) Date of Patent: Dec. 3, 2013

(54) MITIGATING MULTIPATH USING STATE TRANSITION DETECTION AND MEASUREMENT

(75) Inventor: Gary Lennen, Cupertino, CA (US)

(73) Assignee: Cambridge Silicon Radio Ltd., Cambridge (GB)

( * ) Notice: Subject to any disclaimer, the term of this patent is extended or adjusted under 35 U.S.C. 154(b) by 181 days.

(21) Appl. No.: 13/190,790

(22) Filed: Jul. 26, 2011

(65) Prior Publication Data

US 2013/0027245 A1  Jan. 31, 2013

(51) Int. Cl.
G01S 19/22 (2010.01)
G01S 19/09 (2010.01)
G01S 5/10 (2006.01)

(52) U.S. Cl.
USPC ............ 342/357.61; 342/357.46; 342/357.78

(58) Field of Classification Search
USPC ............ 342/357.25, 357.46, 357.61, 357.63, 342/357.78; 701/468, 470
See application file for complete search history.

(56) References Cited

U.S. PATENT DOCUMENTS

| 5,963,582 A | 10/1999 | Stansell, Jr. |
| 6,493,378 B1 | 12/2002 | Zhodzishsky |
| 2008/0151971 A1 | 6/2008 | Mo et al. |

FOREIGN PATENT DOCUMENTS

| WO | WO 98/13947 | 4/1998 |
| WO | WO 03/001699 | 1/2003 |

OTHER PUBLICATIONS

Great Britain Search Report for Application No. GB1213261.9, dated Oct. 18, 2012.
Least Squares printed from Wikipedia, the free encyclopedia, http://en.wikipedia.org/wiki/Least_squares, Jul. 18, 2011.
"Introduction to Estimation and Least Squares", AER04701 Space Engineering 3-Week 4, Mar. 21, 2011.

*Primary Examiner* — Dao Phan
(74) *Attorney, Agent, or Firm* — RatnerPrestia

(57) ABSTRACT

A global positioning satellite (GPS) receiver that includes a radio frequency (RF) receiver receiving a first GPS signal from a GPS satellite and a processor. The processor is configured to correlate the first GPS signal with a plurality of reference signals to produce a plurality of correlations, detect a transition between receiving the first GPS signal and receiving a second GPS signal from the GPS satellite based on a phase shift in the correlations, and if the transition is detected, compensate for the phase shift when computing a range to the GPS satellite.

20 Claims, 10 Drawing Sheets

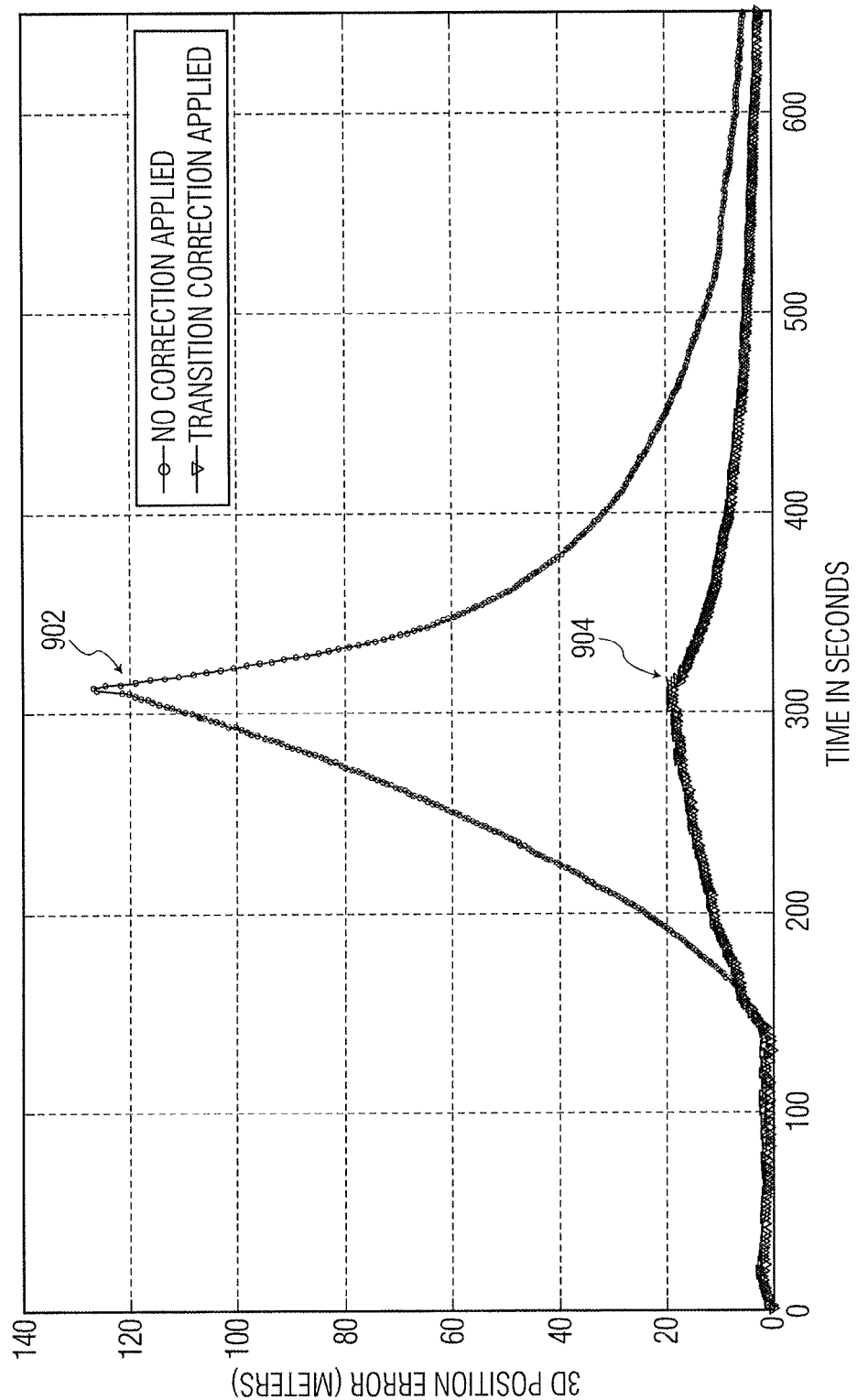

US 8,599,067 B2

MITIGATING MULTIPATH USING STATE TRANSITION DETECTION AND MEASUREMENT

FIELD

The present invention relates, in general, to a system and a method for mitigating multipath in a global positioning satellite (GPS) receiver.

BACKGROUND

In MP environments (e.g. urban canyon) a direct satellite signal reflects off nearby objects such as buildings producing MP signals. In one example, the GPS receiver may receive the LOS signal along with MP signals. In another example, the GPS receiver may only receive MP signals (i.e. the LOS may be completely blocked by the buildings in an urban canyon environment).

When a conventional GPS receiver locks onto an MP signal, pseudo-range and position errors may occur (e.g. the indirect path of the MP signal makes the satellite appear to be farther away from the GPS receiver than it actually is). Thus, in the conventional GPS receiver, transitioning from: an LOS signal to a MP signal, an MP signal to an LOS signal, or an MP signal to another MP signal may introduce error into the computed position of the GPS receiver.

SUMMARY

A global positioning satellite (GPS) receiver that includes a radio frequency (RF) receiver receiving a first GPS signal from a GPS satellite and a processor. The processor is configured to correlate the first GPS signal with a plurality of reference signals to produce a plurality of correlations, detect a transition between receiving the first GPS signal and receiving a second GPS signal from the GPS satellite based on a phase shift in the correlations, and if the transition is detected, compensate for the phase shift when computing a range to the GPS satellite.

BRIEF DESCRIPTION OF THE FIGURES

FIG. 9 is a graph of corrected and uncorrected 3D position solution when transitioning from the LOS signal to an MP signal, and back again to the LOS signal, according to an exemplary embodiment of the present invention.

DETAILED DESCRIPTION

As will be described, a system and a method for mitigating multi-path error in a GPS receiver is proposed. Specifically, in an urban canyon environment (i.e., a city with buildings), an LOS signal from a GPS satellite may be transmitted and reflected off nearby objects such as the ground, buildings and trees. As a GPS receiver (located in an automobile) travels through the urban canon, the GPS receiver may transition from tracking the LOS signal from the satellite to tracking an MP signal from the satellite. Alternately, the GPS receiver may transition from an MP signal back to the LOS signal or from one MP signal to another MP signal. It is also noted that in another example, the signal received by the GPS receiver may be a summation of the LOS signal and at least one MP signal (i.e. transitions may occur from an LOS only signal or an MP only signal, to a summation of an LOS signal and MP signal or a summation of an MP signal and another MP signal).

In the example where the GPS receiver transitions from tracking the LOS to the MP signal, the satellite may appear to be further away from the receiver then it actually is (i.e., the MP signal may travel a longer path as it reflects off of objects in order to reach the GPS receiver and therefore range may be over estimated). In general, the range over estimation may introduce a positioning error for the GPS receiver.

In one example, the transition between tracking the LOS and the MP signal (i.e. a state transition) is detected by a phase shift in correlations being performed by the receiver. A corrective phase shift used to correct the correlation (i.e. balance the early (E) and late (L) correlations) is then computed and utilized to compensate for the error. Compensation may be performed by subtracting distance from the range measurements or weighting a satellites contribution to the position solution in response to the receiver recognizing that it has transitioned from one signal to another signal.

In one example, the system detects state transitions where the receiver switches from tracking a line of sight (LOS) signal to tracking multi-path (MP) signals, from MP to LOS and from MP to MP are detected. In general, the code phase shift that occurs during the transition corresponds to a distance shift to the satellite which is then compensated for. Accuracy of the GPS receiver location is therefore improved in a MP environment.

Figure 1A:
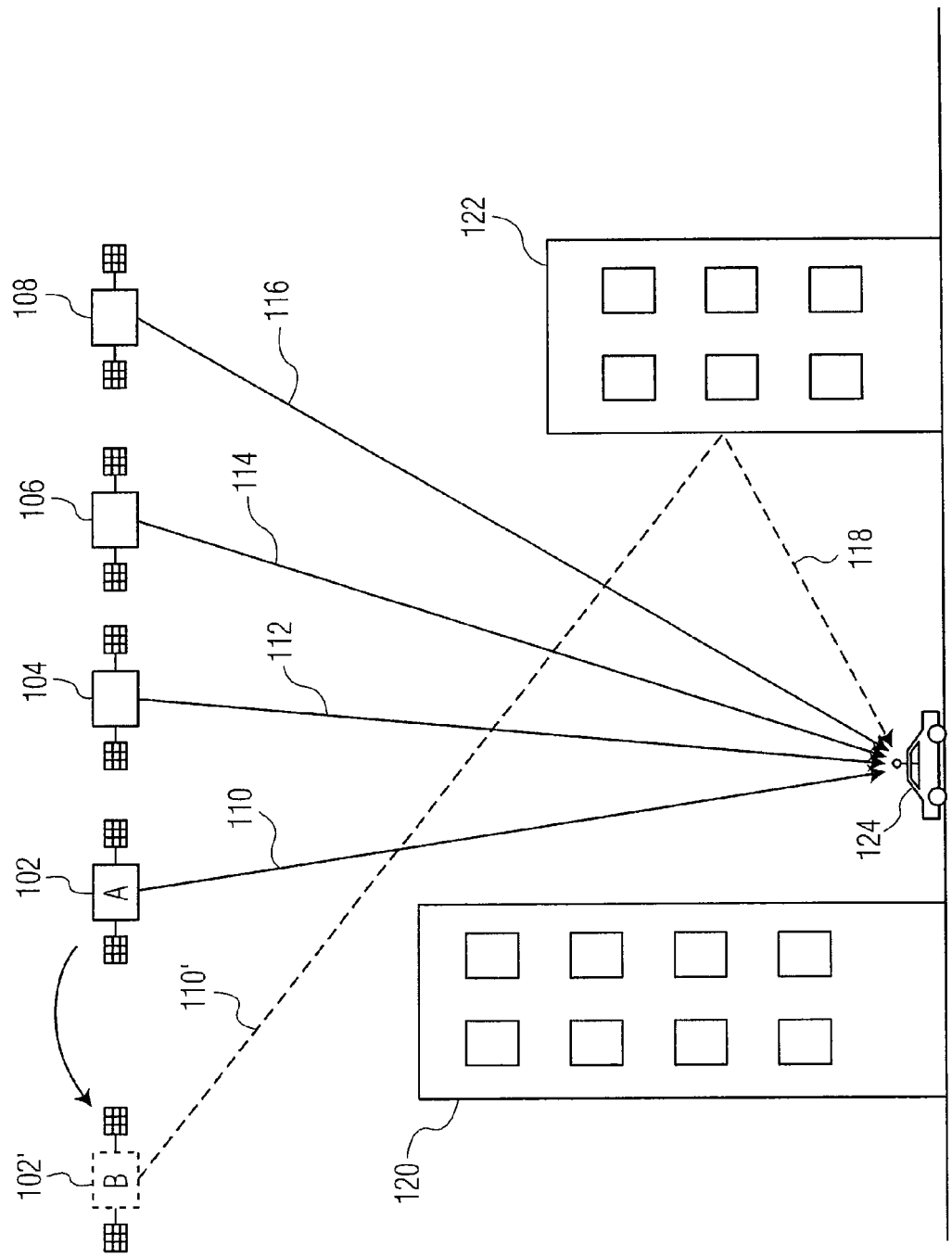
FIG. 1A is a view of a GPS receiver located in an urban canyon environment, according to an exemplary embodiment of the present invention.
Figure 1B:
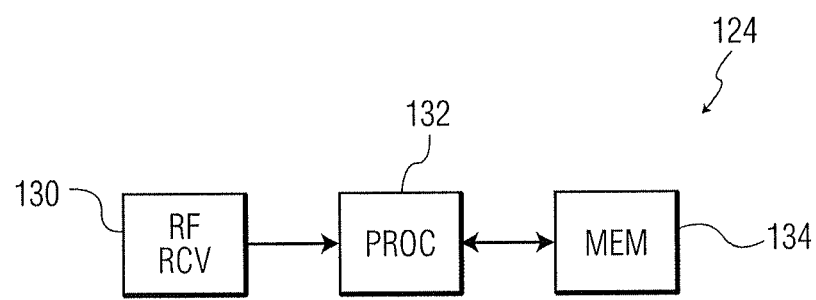
FIG. 1B is a view of the GPS receiver hardware, according to an exemplary embodiment of the present invention.

As shown in FIG. 1A, an urban canyon environment may include buildings 120 and 122 through which a vehicle that includes GPS receiver 124 is traveling. As shown in FIG. 1B, the GPS receiver may include a radio frequency (RF) receiver 130, a microprocessor 132 and a memory 134 for receiving and processing the GPS signals to determine the location of the receiver. In one example, GPS receiver 124 may receive GPS signals from satellites 102 and 104, 106 and 108. It is noted that although only four satellites are shown, that N satellites where N>1 may be utilized.

In the example shown in FIG. 1A, GPS receiver 124 receives LOS signals 112, 114 and 116 from satellites 104, 106 and 108 respectively (i.e., the buildings do not block the signals). In a first time period, GPS receiver 124 may also receive an LOS signal from satellite 102'. However, in another time period, GPS satellite 102' may move from position A to position B where a direct LOS signal can not reach GPS receiver 124 due to an obstruction such as building 120. The direct LOS signal 110' therefore reflects off of building 122 as MP signal 118 which is received at GPS receiver 124.

When satellite 102' moves from position A to B, a state transition occurs where the GPS receiver 124 switches from receiving the LOS signal 110' to receiving the MP signal 118. In this example, the GPS receiver detects the state transition and compensates for phase shift introduced by this transition to reduce errors in the position solution. The detection and compensation of these state transitions are described with respect to FIGS. 2-7.

In general, the GPS receiver 124 when in tracking mode, may perform N correlations between the received GPS signal (e.g. the Coarse/Acquisition C/A code received from a satellite) and N (e.g., 16) references signals. In general, the N reference signals are time shifted (e.g. by fractions of a code chip) with respect to each other to produce an N tap correlation window. The N correlation values produce a peak correlation which is used to determine the phase of the received GPS signal.

Figure 5:
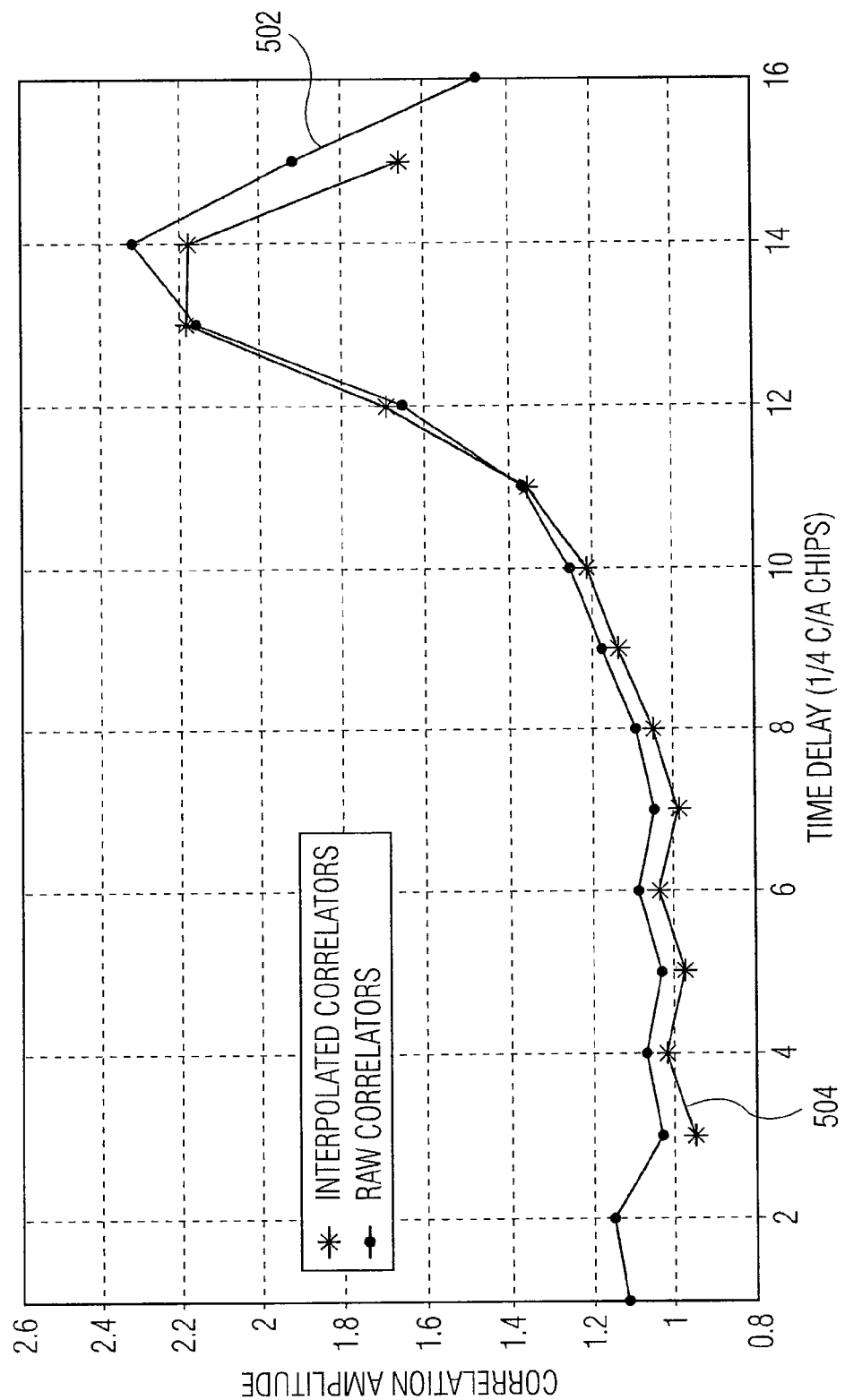
FIG. 5 is a graph of a correlation showing a late phase shift of the correlation function, according to an exemplary embodiment of the present invention.
Figure 6:
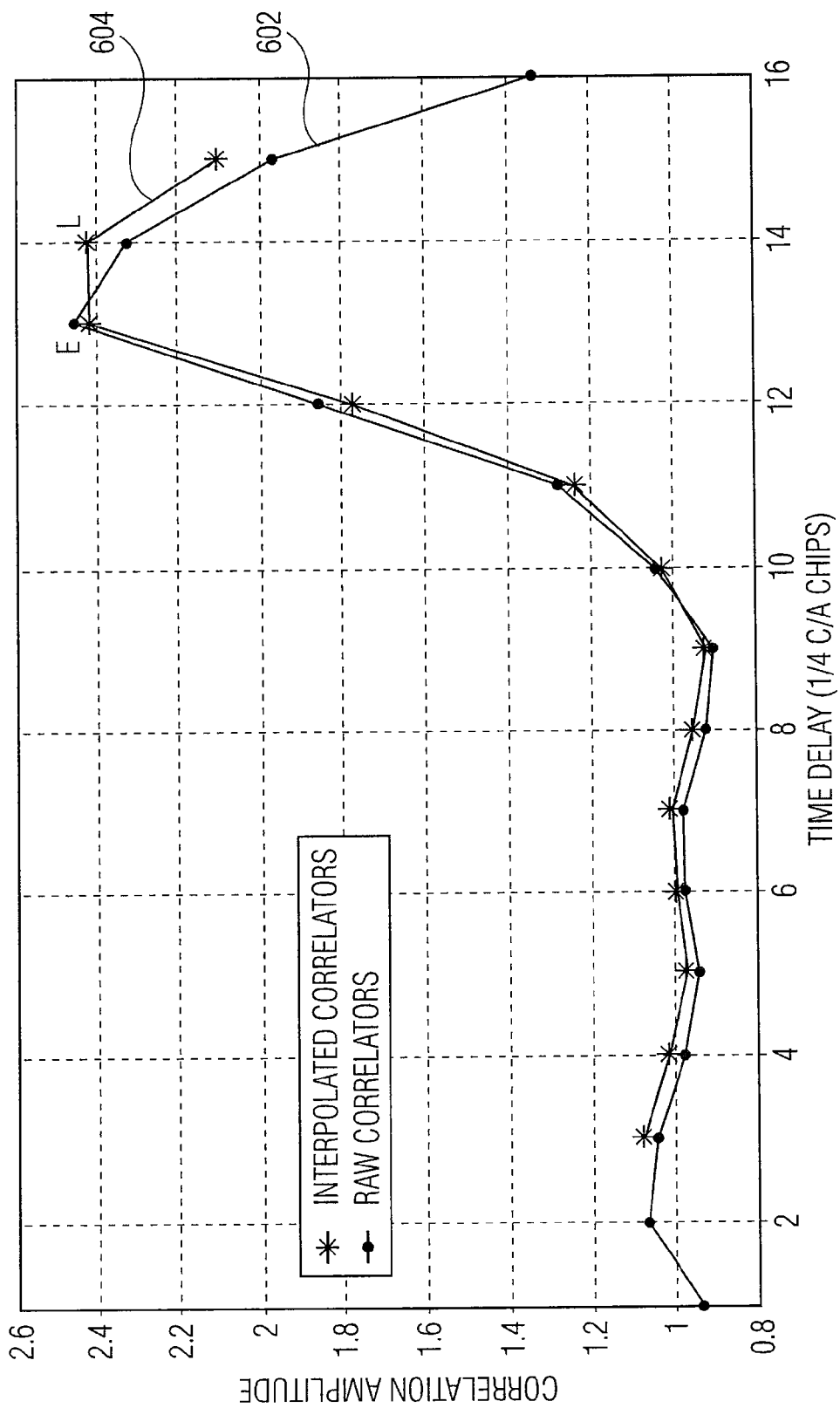
FIG. 6 is a graph of a correlation showing an early phase shift of the correlation function, according to an exemplary embodiment of the present invention.

In some examples, the peak correlation value may fall in between two of the N correlations (i.e., between the E and L correlations). If the E and L correlations have an equivalent amplitude, then it is assumed that the peak correlation value falls in between both correlations (e.g., if correlations 13 and 14 as shown in FIGS. 5 and 6 have the same correlation amplitude, then it is known that the peak is directly in between correlations 13 and 14).

In general, the GPS receiver has a code tracking loop which locks onto the received GPS signals in order to balance the E and L correlations to be equivalent (i.e. E=L). However, the code tracking loop typically responds slowly (i.e., balancing E and L make take 5-10 seconds).

In one example, the GPS receiver utilizes a fast interpolation algorithm (e.g., operating at 1 Hz) that performs interpolation in order to determine the corrective phase shift required to balance out the E and L correlation results before the code tracking loop performs the balancing (i.e., the interpolation algorithm may balance the E and L correlations once every second, whereas the standard code tracking may take 5-10 seconds to balance E and L).

Thus, in one example, the fast interpolation algorithm is a code tracking loop with a wide bandwidth (e.g. 1 Hz), while the standard code tracking loop has a narrow bandwidth (e.g. 0.2 Hz). Due to the tracking speed differential between the loops, the wide bandwidth code tracking loop (i.e. the interpolation algorithm) is able to quickly predict the future behavior of the slower narrow bandwidth code tracking loop. Compensation may then be performed as the narrow bandwidth code tracking loop slowly begins to skew.

When the interpolation operation determines the phase shift to balance E and L, the phase shift may be compared to a threshold in order to determine if a transition between receiving LOS signals and MP signals has occurred. If the phase shift is small, it may be determined that the phase shift is due to random noise and not a transition. However, if the phase shift is large, it may be determined that a transition has occurred. In this example, the phase shift introduced by the transition is compensated (i.e., the erroneous phase shift due to transitioning between two different signals may be compensated for so that error in the position solution is minimized). Details of the algorithms for performing the interpolation, determining the phase shift and compensating for the phase shift are described with respect to the flow charts in FIGS. 2-4.

Figure 2:
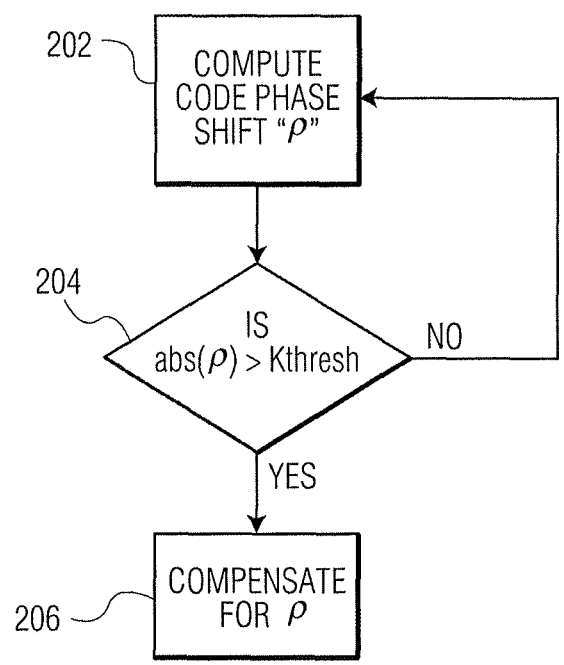
FIG. 2 is a flow chart for detecting a transition between GPS signals and compensating for the associated phase shift, according to an exemplary embodiment of the present invention.
Figure 4:
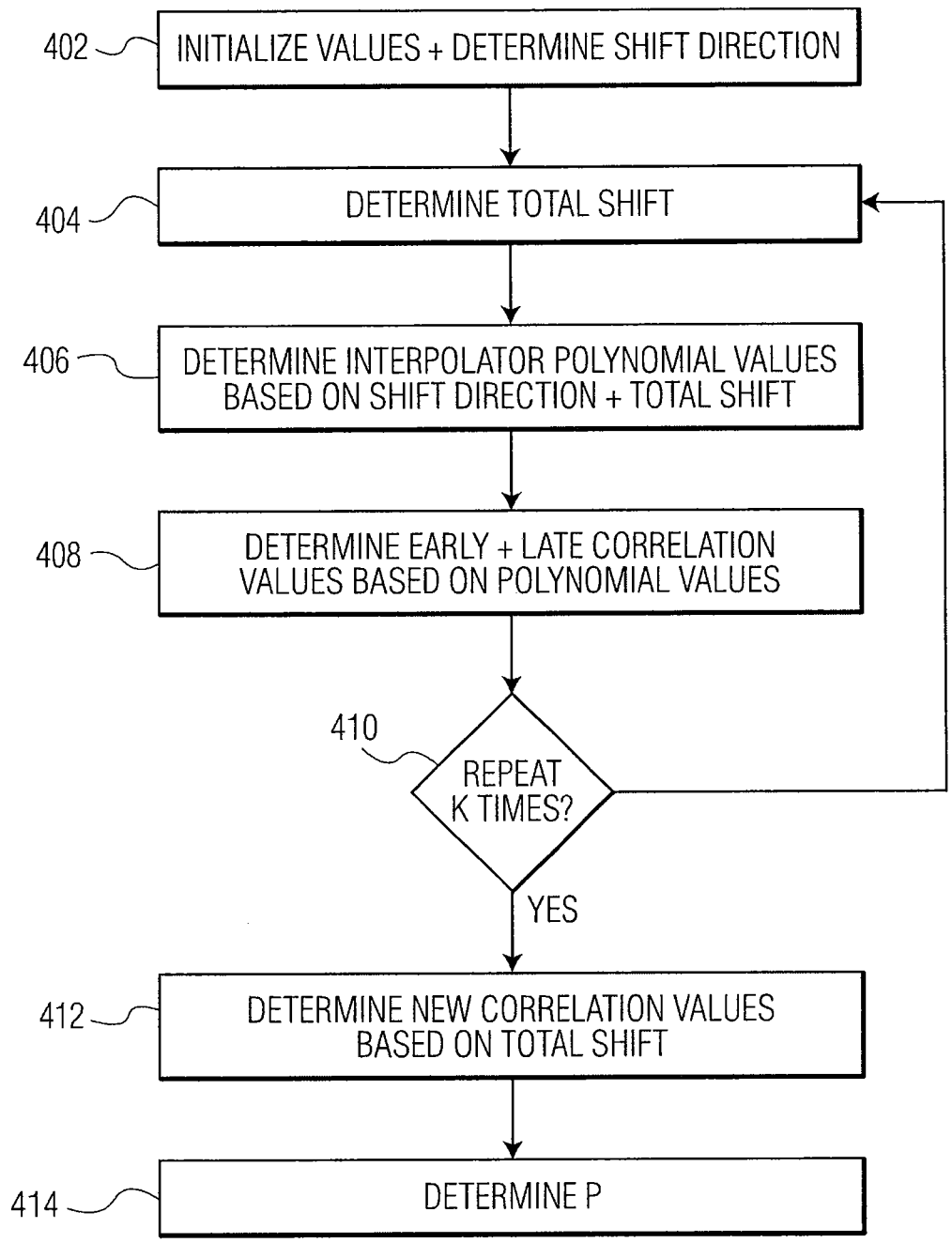
FIG. 4 is a flow chart for determining the phase shift in FIGS. 2 and 3, according to an exemplary embodiment of the present invention.

As shown in FIG. 2, a distance value $\rho$ proportional to the code phase shift is computed in step 202 (details are described in FIG. 4). The absolute value of $\rho$ may then be compared to a distance threshold $K_{thresh}$ (i.e., it is determined if $\rho$ is above a particular threshold to determine if a transition has occurred). Alternately, the code phase shift itself may be compare to a phase threshold. At step 204, if $\rho$ is less than or equal to the distance threshold, then the phase shift may be computed again (i.e. a transition is determined to not have occurred). If however $\rho$ is greater than the threshold, then in step 206 $\rho$ may be compensated for.

The distance threshold $K_{thresh}$ may be a fixed threshold or may be variable. $K_{thresh}$ may be varied based on a measured carrier to noise ratio (CNO) for the received GPS signal. For example, when the CNO is high, the distance value $\rho$ may be more trusted (i.e. less noisy) and therefore $K_{thresh}$ may be reduced (i.e. the sensitivity to detecting transitions is increased). When the CNO is low, the distance value $\rho$ may be less trusted (i.e. more noisy) and therefore $K_{thresh}$ may be increased (i.e. the sensitivity to detecting transitions is decreased)

Figure 3:
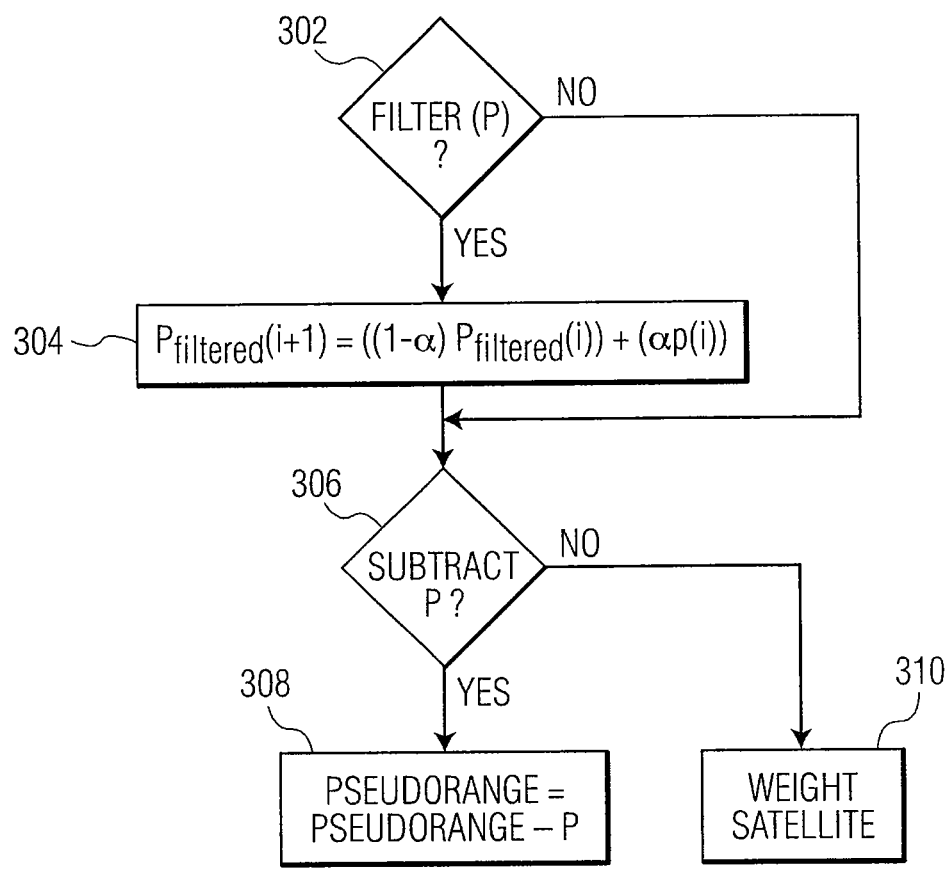
FIG. 3 is a flow chart for compensating for the phase shift determined in FIG. 2, according to an exemplary embodiment of the present invention.

As shown in FIG. 3, once $\rho$ is computed, and it is determined that a transition has occurred, then $\rho$ is utilized to compensate for the error. In one example as shown in step 302, it is determined whether $\rho$ is to be filtered or not (i.e., whether $\rho$ should instantaneously compensate for the error or gradually compensate for the error over a time period). If it is determined that $\rho$ is to be filtered, then the filtering algorithm as shown in 304 may be implemented. Since the code tracking loop takes 5-10 seconds to introduce the transition error into the GPS solution, the compensation for $\rho$ may be gradually increased every second, or every fraction of a second to effectively mimic the error introduced to the GPS receiver (i.e., as the error is introduced gradually, then the correction may be introduced gradually). It is noted that equation in step 304 is only an example filter, and that other equations may be utilized to filter $\rho$. If, at step 302, it is determined that $\rho$ is not filtered, then the filtering step may be skipped and compensation may be instantaneous or delayed by some fixed amount of time.

In order to compensate for the $\rho$ value, two examples are shown in FIG. 3 (a subtraction algorithm 308 and a weighting algorithm 310). If it is determined in step 306, that the subtraction algorithm is to be utilized, then the $\rho$ distance value is subtracted from the pseudorange as shown in step 308. For example, if a transition occurs where the GPS receiver switches from an LOS signal to an MP signal, then the $\rho$ value (i.e., the additional distance added due to the multi-path error) will be subtracted from the pseudorange. Likewise, if the GPS receiver switches from tracking an MP signal to the LOS signal, then the $\rho$ value that was previously subtracted is no longer subtracted. The subtraction algorithm also works when transitioning between MP signals. For example, if the GPS receiver switches from an MP signal to an even later (i.e. more delayed) MP signal, then a different (i.e. larger) $\rho$ distance value may be subtracted. If the GPS receiver switches from an MP signal to an earlier MP signal, then a different (i.e. smaller) $\rho$ distance value may be subtracted. In general, this algorithm may compensate for multiple transitions between the LOS signal and multiple MP signals.

Alternately, a weighting algorithm 310 may also be utilized. In general, computing a position of the GPS receiver is performed based on a plurality of satellites (e.g., three or more satellites). In one example, if one of the satellites is determined to have transitioned to an MP signal, then the data from that satellite may be weighted in the position solution so that it does not contribute significantly to computing the position of the GPS receiver). This may be performed by multiplying the satellite's contribution to the positioning of the GPS receiver by a fractional number (i.e., between 0 and 1). This may also be performed for other satellites that have detected transitions. For example, if the GPS receiver is receiving LOS signals from satellites 104, 106 and 108, then the contribution of these satellites may be weighted with as 1.0 (100%) in the position solution. If the GPS receiver is receiving the MP signal from satellite 102, then the contribution of satellite 102 may be weighted by 0.1 (10%) in the position solution.

In one example, the weighting may be a fixed weight that attenuates the troubled satellite to a fixed level. In another example, the satellite may be weighted based on the value of ρ. For example, if the ρ value is determined to be a large distance (i.e., that satellite has a large error), then the weighting of the satellite may be decreased (i.e. the satellite will contribute less significantly to the position solution). In contrast, when the ρ value is determined to be a small distance, (i.e., the satellite has small error), then the weighting of the satellite in the solution may be increased (i.e., the satellite will contribute more significantly to the position solution). It is noted that the subtraction compensation method and the weighting compensation method are two examples of compensation algorithms. Other equivalent algorithms for compensating for ρ may also be utilized.

Shown in FIG. 4 is a flow chart that describes the process for performing interpolation to determine the ρ value to determine if a transition has occurred. For example, as shown in step 402, the total shift may be initialized to 0, and the shift size may be initialized to 0.5. The shift direction (i.e., a 1 or a −1) may also be initialized to indicate an early shift (e.g. shift from MP to LOS) or a late shift (e.g. shift from LOS to MP). In step 404, the total shift is determined by adding the shift size to the total shift. In step 406, the interpolator determines the polynomial values (i.e., the polynomial coefficients of the interpolator are determined based on the total shift and the shift direction). In step 408, the E and L correlation values are determined based on the polynomial values. In step 410, steps 404, 406 and 408 are repeated K times in order to converge and balance out the E and L correlations.

In one example, in order to converge and balance E and L correlations, the shift size is reduced by half with each loop iteration (e.g., 0.5, 0.25, 0.125, of a chip etc.). This method provides K bits of resolution in order to determine the fractional chip shift needed to balance the E and L correlation results (i.e., the phase shift required to balance the E and L correlations).

Once steps 404, 406 and 408 are repeated K times, step 412 determines the new correlation values based on the total shift. The ρ value (i.e. the distance value) is then determined in step 414 based on the total shift. In order to convert the total shift into the ρ distance value, it is noted that a single chip in the GPS received signal may be equivalent to approximately 300 meters of distance. Therefore, a quarter of the chip is equivalent to approximately 75 meters of distance. Thus, if a quarter of a chip accuracy is available, and the phase shift μ (see the pseudo code in the table) is equal to 0.1, then the ρ distance value is 7.5 meters (i.e., 10% of a quarter of a chip).

It is noted that prior to interpolation another step may be implemented to compute a whole sample code shift offset (i.e. an integer shift). This may be implemented by finding the peak correlation and the next peak adjacent to it. For example if a peak is found at correlation 14 and the next adjacent peak (13 or 15) is found in correlation 13, then there is no whole sample shift required to be added to the fractional ρ value. If the next peak is found to be correlation 15, then a one sample (¼ chip) value may be added to the ρ value, with the ρ value computed by balancing correlations 14 and 15 instead of 13 and 14.

After the ρ value is determined in step 414, the ρ value is compared to a threshold to determine if a transition has occurred as shown in FIG. 2. In the example described above, a ρ shift of 7.5 meters may be less then a threshold (e.g. 50 meters) and therefore may indicate that a shift did not occur. However, if the ρ value is equal to 75 meters, then it may greater than a threshold (e.g. 50 meters) and therefore may indicate that a transition has occurred. In general, pseudo code is shown in table 1 below which describes a method for performing the interpolation to determine the ρ value (i.e., FIG. 4), determining if a transition has occurred based on the ρ value (i.e., FIG. 2), and compensating for the ρ value if a transition has occurred (i.e., FIG. 3).

TABLE 1

Example Polynomial Coefficients $$q_{-1} = -\left(\frac{\mu^3}{6}\right) + \left(\frac{\mu^2}{2}\right) - \left(\frac{\mu}{3}\right)$$

$$q_0 = \left(\frac{\mu^3}{2}\right) - (\mu^2) - \left(\frac{\mu}{2}\right) + 1$$

$$q_1 = -\left(\frac{\mu^3}{2}\right) + \left(\frac{\mu^2}{2}\right) + \mu$$

$$q_2 = \left(\frac{\mu^3}{6}\right) - \left(\frac{\mu^2}{6}\right)$$

Example 4 tap correlator to be phase shifted $C_{0\ shifted} = (C_1 \times q_{-1}) + (C_0 \times q_0) + (C_{-1} \times q_1) + (C_{-2} \times q_2)$
Example Interpolation algorithm to balance E and L correlations and compute ρ

```
shift_size = 0.5;
total_shift = 0;
if( early > late )
    shift_direction = 1;
else
    shift_direction = −1;
end
for k = 1:10
    total_shift = total_shift + shift_size;
    μ = total_shift * shift_direction;
    compute q values for μ;
    compute new early and late correlation values;
    if( shift_direction = = −1 )
        if( new early > new late )
            total_shift = total_shift − shift_size;
        end
    end
    if( shift_direction = = 1)
        if( new early < new late )
            total_shift = total_shift − shift_size;
        end
    end
    shift_size = shift_size / 2;
end % for k
μ = total_shift * shift_direction;
compute q values for μ;
compute new correlation window values (1:16) = > (3:15)
compute ρ
```

TABLE 1-continued

Example algorithm for determining if a transition has occurred and compensating

```
if ( abs(p) > K_thresh )
   state_transition(i) = true
else
   state_transition(i) = false
end
if (state_transition(i) = = true )
   if ( p> 0)// Correlation is moving to the late side
      code_phase _ correction(i) = p //Keep track of how far late we have
      moved else // Correlation is moving to the early side
      code_ phase_correction(i) = 0
         move code tracking point early by p //This is rapid recovery of
                                             multipath // track to direct signal
                                             track
   end
end
if(filter= =true)
for i=1:M
p_filtered (i + 1) = ((1 − a) p_filtered (i)) + [a p(i)]
where a is chosen such that the bandwidth of p_filtered is the same as the
code tracking loop (e.g. a=0.25)
pseudo_range (i) = pseudo _ range(i) − p(i) // Correct pseudo _ range
with transition jump
end
else
pseudo_ range = pseudo _ range − p // Correct pseudo _ range with
transition jump
```

Shown in FIG. 5 is a plot of 16 correlations that are locked onto a GPS signal. The peak correlation of curve 502 shows that the E and L correlation values (i.e., correlations 13 and 14 are not equivalent). Specifically, correlation 14 has a higher peak which translates into a late shift in the received GPS signal. This late shift may be due to the normal movement of the GPS receiver/GPS satellite or may be due to a transition between receiving the LOS signal and an MP signal. Thus, the interpolation algorithm as described with respect to the pseudo code and FIG. 4 may be utilized to balance the E and L values at 13 and 14 as depicted by corrected curve 504.

Similarly, in FIG. 6, the peak correlation values 13 and 14 of curve 602 are not balanced (i.e., correlation 13 has a higher peak then correlation 14 which his equivalent to an early shift in the GPS signal). This early shift may be due to movement of the GPS receiver/GPS satellite, or may be due to a transition between tracking an MP signal to tracking an LOS signal. Thus, the interpolation algorithm as described with respect to the pseudo code and FIG. 4 may be utilized to balance the E and L values at 13 and 14 as depicted by corrected curve 604.

Thus, the E and L correlation values as shown in FIGS. 5 and 6 are balanced resulting in a ρ value that is used to determine if a transition has occurred. If it is determined if an E or an L transition has occurred, then the ρ value is compensated for by one of the compensation algorithms described in FIG. 3.

Figure 7:
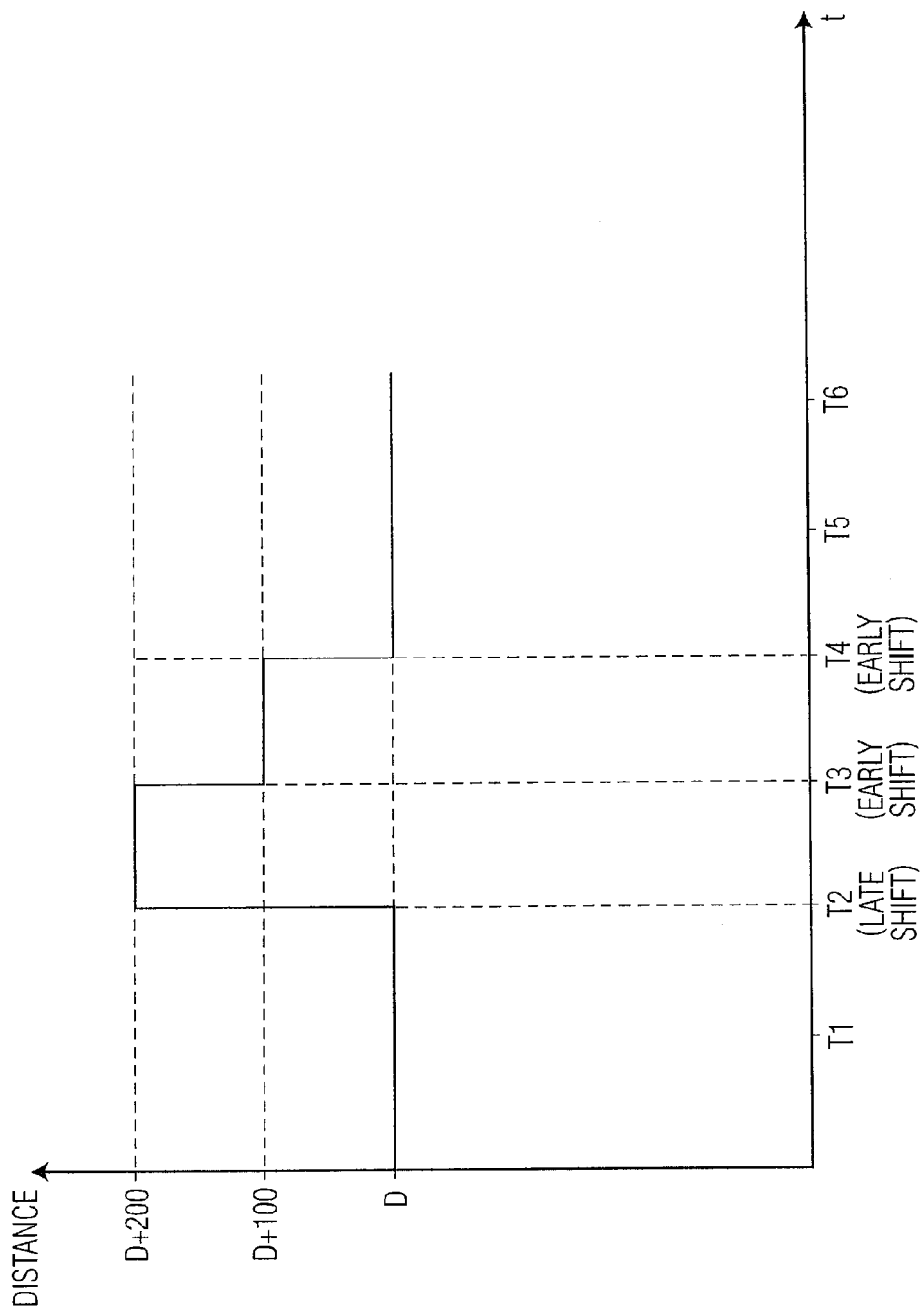
FIG. 7 is a graph of a simulated range between the GPS receiver and the GPS satellite with late and early shifts occurring due to transitions between receiving LOS and MP GPS signals, according to an exemplary embodiment of the present invention.

Shown in FIG. 7 is an example of the distance (i.e., the pseudo range) computed between a GPS receiver and a respective GPS satellite. In this example, distance D may be the ideal distance between the GPS receiver and GPS satellite when it is locked onto the LOS signal. From time 0 to time T2, the distance D may be accurate since the GPS receiver is locked onto the LOS signal. However, at time T2 the GPS receiver may transition from the LOS signal to an MP signal that produces a late shift resulting in a 200 meter error in the pseudo range. At time T2, the GPS receiver determines if a transition has occurred and then compensates for that transition (i.e., the 200 meter error may be subtracted from the pseudo range. At time T3, an early shift may occur where the GPS receiver transitions from one MP signal to an earlier MP signal that has an associated 100 meter error. At time T3, the system may detect a 100 meter transition and therefore subtract only 100 meters from the pseudo range. At time T4, another early shift may occur where the GPS receiver transitions from the early MP signal back to the LOS signal. The system may detect a transition and not subtract any ρ value from the pseudo range (i.e., since the GPS receiver is locked onto the LOS signal, then compensation may not be needed).

Figure 8:
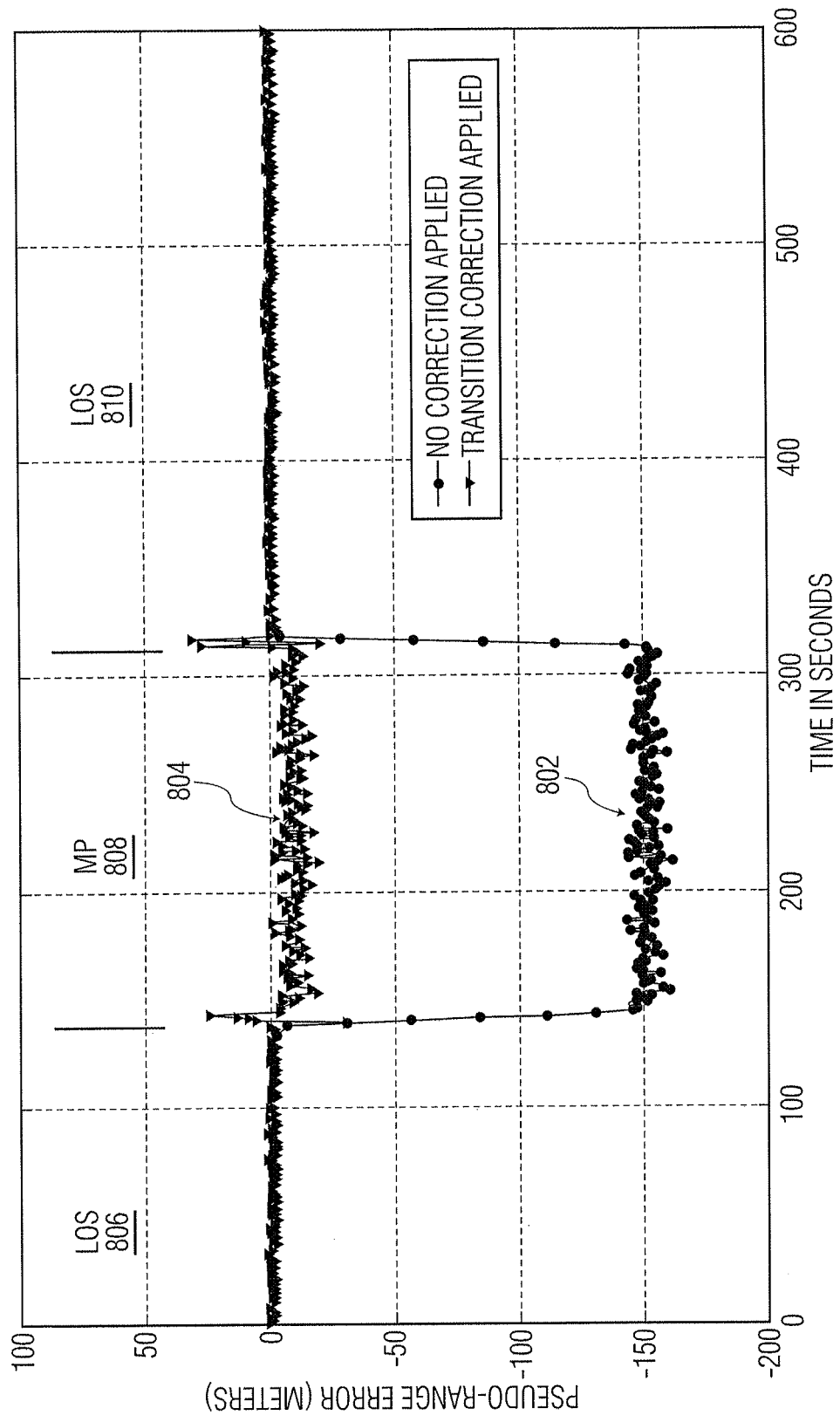
FIG. 8 is a graph of corrected and uncorrected pseudo range data when transitioning from the LOS signal to an MP signal, and back again to the LOS signal, according to an exemplary embodiment of the present invention.

Shown in FIG. 8 is a plot of pseudo range error that occurs when transitioning between an LOS only signal during time period 806 to an MP only signal during time period 808 and back to the LOS only signal in during time period 810. It is shown by data 802, that when no correction is applied, approximately a 150 meter error is introduced into the pseudo range. In contrast, it is shown by data 804, that when correction (as described above) is applied, the pseudo range error is reduced.

Shown in FIG. 9 is a plot of three dimensional (3D) position solution error that occurs when transitioning between an LOS only signal during time period 806 to an MP only signal during time period 808 and back to the LOS only signal in during time period 810. It is shown by data 902, that when no correction is applied, approximately a 125 meter error is introduced into the 3D position solution. In contrast, it is shown by data 904, that when correction (as described above) is applied, the 3D position solution error is reduced.

It is noted that although specific transition detection and compensation algorithms are described, that other equivalent algorithms may be utilized to determine the transition between detecting the GPS signals and compensating for the errors introduced by those transitions. It is also noted that the system may be implemented by microprocessor or a field programmable gate array (FPGA) which performs the various interpolation, detection and compensation algorithms described throughout the specification. It is also noted that the algorithms described above may be implemented using software stored on a non-transitory computer-readable medium such as memory, CD or DVD.

It is also noted that the methods and apparatuses described may be implemented in satellite navigation systems other than GPS (e.g. Glonass, Galileo, etc.) and ground based systems (e.g. code division multiple access (CDMA) signals used as ranging signals).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A global positioning satellite (GPS) receiver, including:
   a radio frequency (RF) receiver receiving a first GPS signal from a GPS satellite; and
   a processor configured to:
      a) correlate the first GPS signal with a plurality of reference signals to produce a plurality of correlations,
      b) detect a transition between receiving the first GPS signal and receiving a second GPS signal from the GPS satellite based on a phase shift in the correlations, and
      c) if the transition is detected, compensate for the phase shift when computing a range to the GPS satellite.

2. The GPS receiver of claim 1,
   wherein the processor determines the phase shift by interpolating the correlations.

3. The GPS receiver of claim 2,
wherein the processor interpolates the correlation to determine a corrective phase shift that results in an equivalent early correlation value and a late correlation value.

4. The GPS receiver of claim 1,
wherein if the transition is detected, the processor converts the phase shift to a distance, and subtracts the distance from the computed range from the GPS satellite to the GPS receiver.

5. The GPS receiver of claim 1,
wherein if the transition is detected, when the processor computes a location of the GPS receiver based on GPS signals received from the GPS satellite and a plurality of other GPS satellites, the processor weights a contribution of the GPS satellite in the location computation based on the phase shift.

6. The GPS receiver of claim 1,
wherein if the transition is detected, the processor immediately compensates for the phase shift.

7. The GPS receiver of claim 1,
wherein if the transition is detected, the processor filters the phase shift, and gradually increases the compensation for the phase shift over a time period.

8. A global positioning satellite (GPS) receiver, including:
a radio frequency (RF) receiver receiving a respective GPS signal from each of a plurality of GPS satellites; and
a processor is configured to:
   a) correlate, for each GPS satellite, the respective GPS signal with a plurality of respective reference signals to produce a plurality of correlations,
   b) detect, for each GPS satellite, a transition between receiving a first GPS signal and receiving a second GPS signal based on a phase shift in the correlations, and
   c) if the transition is detected for a respective GPS satellite, compensate for the phase shift when computing a range to the respective GPS satellite.

9. The GPS receiver of claim 8,
wherein the processor determines the phase shift for each GPS satellite by interpolating the correlations for each GPS satellite.

10. The GPS receiver of claim 8,
wherein the processor interpolates each of the correlations to determine a corrective phase shift that results in an equivalent early correlation value and a late correlation value.

11. The GPS receiver of claim 8,
wherein if a transition is detected for a respective GPS satellite, the processor converts the phase shift to a distance, and subtracts the distance from the computed range from the respective GPS satellite to the GPS receiver.

12. The GPS receiver of claim 8,
wherein if the transition is detected for a respective GPS satellite, when the processor computes a location of the GPS receiver based on the GPS signals received from the plurality of GPS satellites, the processor compensates for the phase shift by weighting a contribution of the respective GPS satellite in the location computation based on the phase shift.

13. The GPS receiver of claim 8,
wherein if the transition is detected, the processor immediately compensates for the phase shift.

14. The GPS receiver of claim 8,
wherein if the transition is detected, the processor filters the phase shift, and gradually increases the compensation for the phase shift over a time period.

15. The GPS receiver of claim 8,
wherein the processor compares the phase shift to a threshold, and detects the transition when the phase shift is greater than the threshold.

16. A global positioning satellite (GPS) receiver, including:
a radio frequency (RF) receiver receiving a first GPS signal from a GPS satellite; and
a processor configured to:
   a) correlate the first GPS signal with a plurality of reference signals to produce a plurality of correlations,
   b) interpolate the correlations to determine a phase shift for balancing an early correlation and a late correlation value of the plurality of correlations,
   c) compare the phase shift to a threshold,
   d) detect a transition between receiving the first GPS signal and receiving a second GPS signal from the GPS satellite if the phase shift is greater than the threshold, and
   e) if the transition is detected, compensating for the phase shift when computing a range to the GPS satellite.

17. The GPS receiver of claim 16,
wherein before interpolating the correlations, the processor shifts the correlations by an integer value to position a peak correlation at a specific correlation location.

18. The GPS receiver of claim 16,
wherein the processor interpolates the correlations using a cubic interpolation algorithm that produces polynomial coefficients for determining a phase shift to balance the early and late correlation values, and
wherein the processor iteratively computes the polynomial coefficients N times to fractionally shift the early and late correlation values around the peak correlation value, the fractional shift decreasing with each iteration.

19. The GPS receiver of claim 16,
wherein before comparing the phase shift to the threshold, the processor adjusts the threshold inversely proportionally with respect to a measured carrier to noise ratio (CNO) for the GPS signal.

20. The GPS receiver of claim 16,
wherein, when the processor computes a location of the GPS receiver based on GPS signals received from the GPS satellite and a plurality of other GPS satellites, if the transition is detected, the processor converts the phase shift to a distance value and weights a contribution of the GPS satellite in the location computation inversely proportionally to the distance value.

* * * * *